(12) United States Patent
Klemen

(10) Patent No.: US 7,163,484 B2
(45) Date of Patent: Jan. 16, 2007

(54) EIGHT-SPEED TRANSMISSIONS WITH FOUR PLANETARY GEAR SETS

(75) Inventor: Donald Klemen, Carmel, IN (US)

(73) Assignee: General Motors Corporation, Detroit, MI (US)

( * ) Notice: Subject to any disclaimer, the term of this patent is extended or adjusted under 35 U.S.C. 154(b) by 180 days.

(21) Appl. No.: 11/041,635

(22) Filed: Jan. 24, 2005

(65) Prior Publication Data
US 2006/0166779 A1 Jul. 27, 2006

(51) Int. Cl.
*F16H 3/62* (2006.01)

(52) U.S. Cl. ............................. 475/276; 475/288

(58) Field of Classification Search ............... 475/280, 475/276, 286, 288, 296, 320
See application file for complete search history.

(56) References Cited

U.S. PATENT DOCUMENTS

| | | | | |
|---|---|---|---|---|
| 3,811,343 | A * | 5/1974 | Mori et al. ................. | 475/285 |
| 3,987,690 | A * | 10/1976 | Murakami et al. .......... | 475/276 |
| 4,070,927 | A | 1/1978 | Polak ......................... | 475/286 |
| 4,709,594 | A | 12/1987 | Maeda ........................ | 475/280 |
| 5,106,352 | A | 4/1992 | Lepelletier .................. | 475/280 |
| 5,385,064 | A | 1/1995 | Reece ......................... | 74/331 |
| 5,497,867 | A | 3/1996 | Hirsch et al. ............ | 192/48.91 |
| 5,560,461 | A | 10/1996 | Loeffler .................... | 192/53.32 |
| 5,599,251 | A | 2/1997 | Beim et al. ................ | 475/275 |
| 5,641,045 | A | 6/1997 | Ogawa et al. .......... | 192/53.341 |
| 5,651,435 | A | 7/1997 | Perosky et al. ............. | 192/219 |
| 5,975,263 | A | 11/1999 | Forsyth .................... | 192/53.32 |
| 6,053,839 | A | 4/2000 | Baldwin et al. ............ | 475/281 |
| 6,071,208 | A | 6/2000 | Koivunen ................... | 475/275 |
| 6,083,135 | A | 7/2000 | Baldwin et al. ............ | 475/276 |
| 6,217,474 | B1 | 4/2001 | Ross et al. ................... | 475/269 |
| 6,354,416 | B1 | 3/2002 | Eo ........................ | 192/53.341 |
| 6,375,592 | B1 | 4/2002 | Takahashi et al. .......... | 475/262 |
| 6,422,969 | B1 | 7/2002 | Raghavan et al. .......... | 475/276 |
| 6,425,841 | B1 | 7/2002 | Haka .......................... | 475/275 |
| 6,471,615 | B1 | 10/2002 | Naraki et al. ............... | 475/262 |
| 6,558,287 | B1 | 5/2003 | Hayabuchi et al. ......... | 475/271 |
| 6,623,397 | B1 | 9/2003 | Raghavan et al. ......... | 360/96.5 |
| 6,960,149 | B1 * | 11/2005 | Ziemer ....................... | 475/276 |
| 2004/0048716 | A1 * | 3/2004 | Ziemer ....................... | 475/286 |
| 2004/0097324 | A1 * | 5/2004 | Ziemer ....................... | 475/296 |

FOREIGN PATENT DOCUMENTS

JP 09-126283 5/1997

OTHER PUBLICATIONS

AllisonTransmission Service Manual DP 8000 Series Off Highway SM1228EN Feb. 2004.
Allison Transmission Service Manual 3000 Product Family SM2148EN Dec. 2004.

* cited by examiner

*Primary Examiner*—Sherry Estremsky
*Assistant Examiner*—Edwin A. Young
(74) *Attorney, Agent, or Firm*—Christopher DeVries

(57) ABSTRACT

Eight-speed transmissions are provided that include four planetary gear sets having seven torque-transmitting mechanisms and various fixed interconnections to provide eight forward speed ratios and at least one reverse speed ratio. The powertrain includes an engine and torque converter that is continuously connected to at least one of the planetary gear members and an output member that is continuously connected with another of the planetary gear members. The seven torque-transmitting mechanisms are operated in combinations of two. Reduced component speeds and improved ratios are achieved.

19 Claims, 3 Drawing Sheets

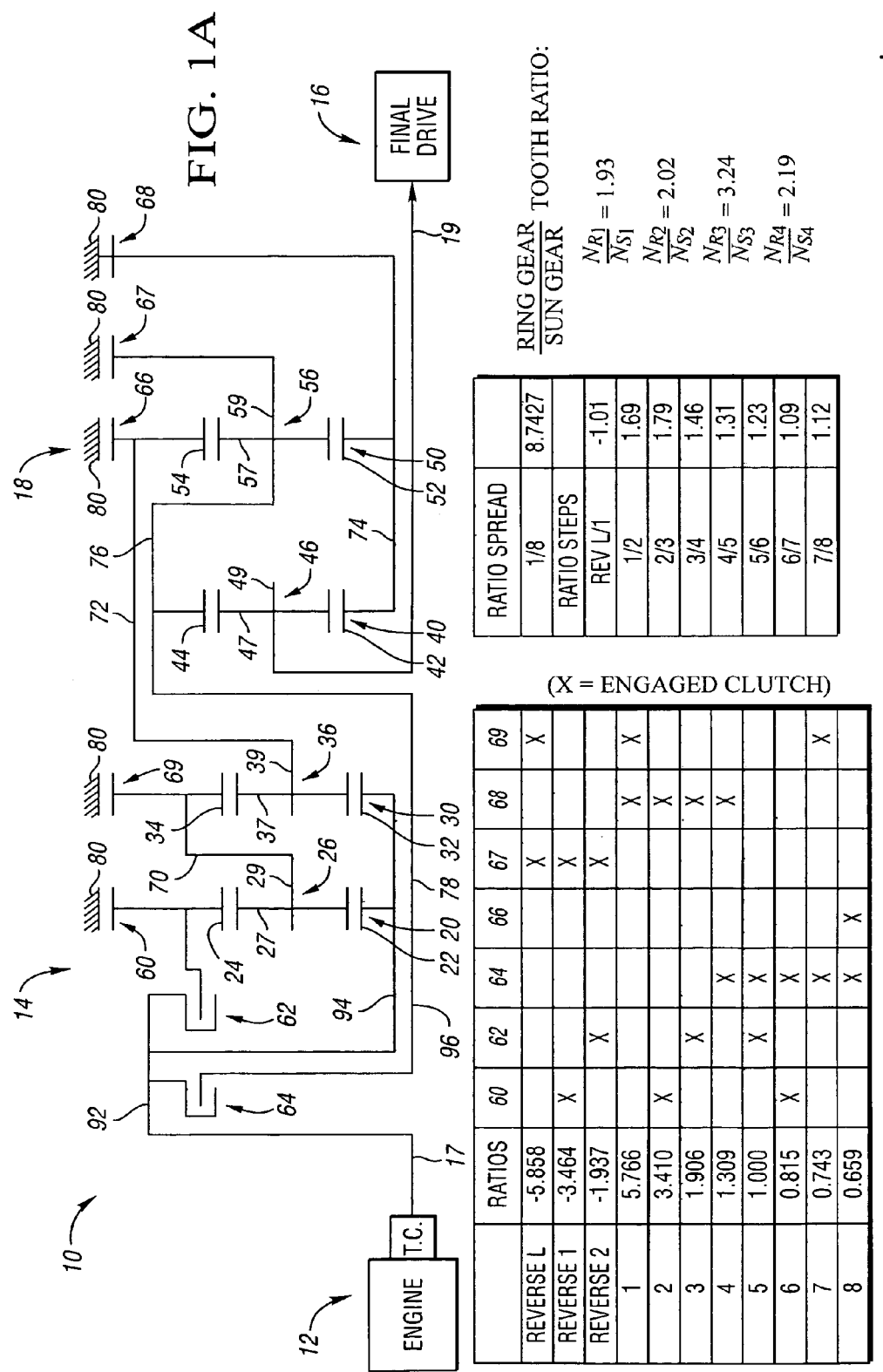

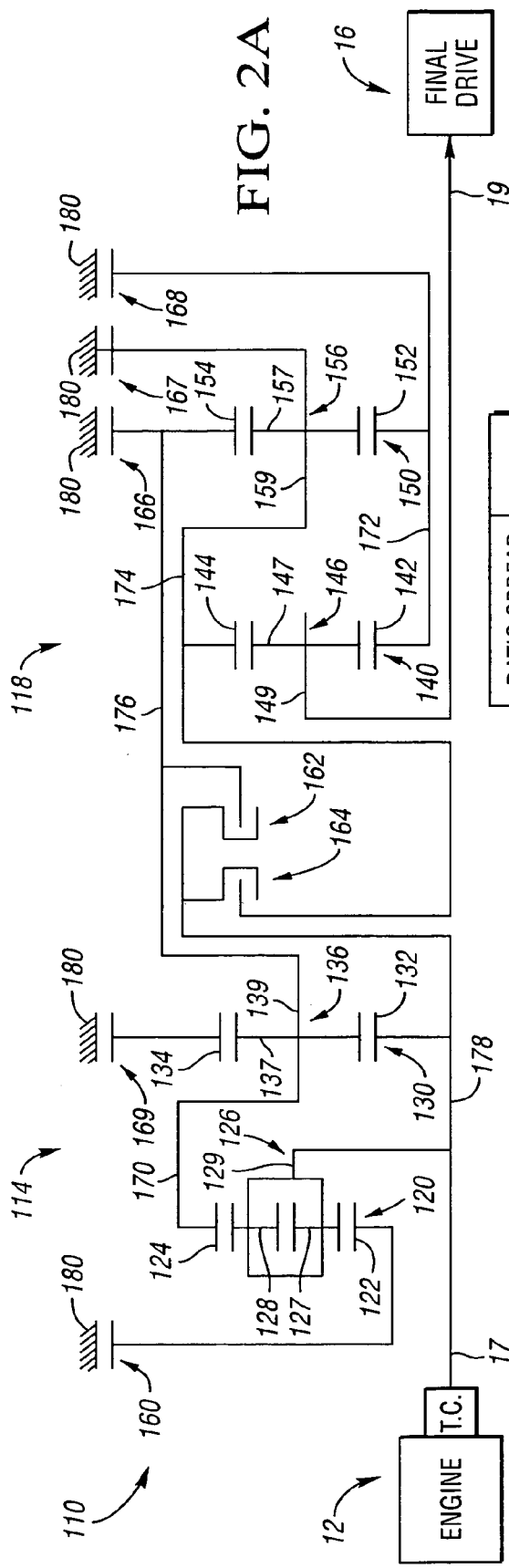

EIGHT-SPEED TRANSMISSIONS WITH FOUR PLANETARY GEAR SETS

TECHNICAL FIELD

The present invention relates to power transmissions having four planetary gear sets that are controlled by seven torque-transmitting devices to provide eight forward speed ratios and at least one reverse speed ratio.

BACKGROUND OF THE INVENTION

Passenger vehicles include a powertrain that is comprised of an engine, multi-speed transmission, and a differential or final drive. The multi-speed transmission increases the overall operating range of the vehicle by permitting the engine to operate through its torque range a number of times. The number of forward speed ratios that are available in the transmission determines the number of times the engine torque range is repeated. Early automatic transmissions had two speed ranges. This severely limited the overall speed range of the vehicle and therefore required a relatively large engine that could produce a wide speed and torque range. This resulted in the engine operating at a specific fuel consumption point during cruising, other than the most efficient point. Therefore, manually-shifted (countershaft transmissions) were the most popular.

With the advent of three- and four-speed automatic transmissions, the automatic shifting (planetary gear) transmission increased in popularity with the motoring public. These transmissions improved the operating performance and fuel economy of the vehicle. The increased number of speed ratios reduces the step size between ratios and therefore improves the shift quality of the transmission by making the ratio interchanges substantially imperceptible to the operator under normal vehicle acceleration.

It has been suggested that the number of forward speed ratios be increased to six or more. Six-speed transmissions are disclosed in U.S. Pat. No. 4,070,927 issued to Polak on Jan. 31, 1978 and U.S. Pat. No. 6,422,969 issued to Raghavan and Usoro on Jul. 23, 2002.

Six-speed transmissions offer several advantages over four- and five-speed transmissions, including improved vehicle acceleration and improved fuel economy. While many trucks employ power transmissions having six or more forward speed ratios, passenger cars are still manufactured with three- and four-speed automatic transmissions and relatively few five or six-speed devices due to the size and complexity of these transmissions.

Seven-speed transmissions are disclosed in U.S. Pat. No. 6,623,397 issued to Raghavan, Bucknor and Usoro. Eight-speed transmissions are disclosed in U.S. Pat. No. 6,425,841 issued to Haka. The Haka transmission utilizes three planetary gear sets and six torque transmitting devices, including two brakes and two clutches, to provide eight forward speed ratios and a reverse speed ratio. One of the planetary gear sets is positioned and operated to establish two fixed speed input members for the remaining two planetary gear sets. Seven-, eight- and nine-speed transmissions provide further improvements in acceleration and fuel economy over six-speed transmissions. However, like the six-speed transmissions discussed above, the development of seven-, eight- and nine-speed transmissions has been precluded because of complexity, size and cost.

SUMMARY OF THE INVENTION

It is an object of the present invention to provide an improved eight speed transmission having four planetary gear sets controlled to provide eight forward speed ratios and at least one reverse speed ratio. Preferably, three reverse speed ratios are achieved. The various embodiments of the improved transmission provide close ratio steps, an overall wide ratio, with reduced internal speeds. Low sun gear and clutch loading is also achieved. The transmissions may be implemented as either the front or rear drive type. The number of shafts required for the transmissions is minimized.

In one aspect of the invention, the transmission has four planetary gear sets, each of which includes a first, second and third member, which members may comprise a sun gear, a ring gear or a planet carrier assembly member.

In referring to the first, second and third gear sets in this description, and in the claims, these sets may be counted "first" to "third" in any order in the drawings (i.e., left to right, right to left, etc.). Additionally, the first, second or third members of each gear set may be counted "first" to "third" in any order in the drawings (i.e., top to bottom, bottom to top, etc.) for each gear set.

In another aspect of the invention, unless otherwise specified herein, planet carrier assembly members of each of the planetary gear sets may be single-pinion carriers or double-pinion carriers.

In yet another aspect of the invention, a first interconnecting member continuously interconnects a first member of the first planetary gear set with a first member of the second planetary gear set.

In yet a further aspect of the invention, a second interconnecting member continuously interconnects the second member of the first planetary gear set with a second member of the second planetary gear set.

In still a further aspect of the invention, a third interconnecting member continuously interconnects the first member of the third planetary gear set with the first member of the fourth planetary gear set.

In still a further aspect of the invention, a fourth interconnecting member continuously interconnects the second member of the third planetary gear set with the second member of the fourth planetary gear set.

In another aspect of the invention, a fifth interconnecting member continuously interconnects one of the second and third members of the second planetary gear set with the third member of the fourth planetary gear set.

In yet another aspect of the invention, each transmission incorporates an input shaft which is continuously connected with a member of the planetary gear sets and an output shaft which is continuously connected with another member of the planetary gear sets.

In a further aspect of the invention, a first torque-transmitting mechanism, such as a brake, is operable for selectively interconnecting the third member of the first planetary gear set with the stationary member.

In a still a further aspect of the invention, a second torque-transmitting mechanism, such as a clutch, is operable for selectively interconnecting either the third member of the fourth planetary gear set or the third member of the first planetary gear set with the input shaft.

In still a further aspect of the invention, a third torque-transmitting mechanism, such as a clutch, is operable for selectively interconnecting the second member of the third planetary gear set and the input shaft.

In still a further aspect of the invention, a fourth torque-transmitting mechanism, such as a brake, is operable for selectively interconnecting the third member of the fourth planetary gear set with the stationary member.

In a still further aspect of the invention, a fifth torque-transmitting mechanism, such as a brake, is operable for selectively interconnecting the second member of the fourth planetary gear set with the stationary member.

In another aspect of the invention, a sixth torque-transmitting mechanism, such as a brake, is operable for selectively interconnecting the first member of the fourth planetary gear set with the stationary member.

In yet another aspect of the invention, a seventh torque-transmitting mechanism, such as a brake, is operable for selectively interconnecting either the second or the third member of the second planetary gear set with the stationary member.

In still a further aspect of the invention, forward ratio shifts are of the single transition type.

In a further aspect of the invention, the first member of the first planetary gear set may be a planet carrier assembly member of the double-pinion type.

In a still further aspect of the invention, the first member of the second planetary gear set may be a planet carrier assembly member of the double-pinion type. The planet carrier assembly member of the first planetary gear set and the planet carrier assembly member of the second planetary gear set may share a common wall to continuously interconnect with one another, thus creating the double-pinion planet carrier assembly member.

In one embodiment of the invention, the input shaft is continuously interconnected with the first member of the first planetary gear set via a first intermediate shaft. The first member of the first planetary gear set is continuously interconnected with the first member of the second planetary gear set via the first intermediate shaft. The first member of the first planetary gear set and the first member of the second planetary gear set are sun gears. A second intermediate shaft is continuously connected with the second member of the third planetary gear set. The second torque-transmitting mechanism selectively interconnects the input shaft with the second member of the third planetary gear set via the second intermediate shaft. Preferably, the first and second intermediate shafts are coaxially disposed.

In a further aspect of the invention, the input shaft is continuously connected with two of the planetary gear sets and is selectively connectable with the other two of the planetary gear sets via one of the seven torque-transmitting mechanisms.

In still another aspect of the invention, the seven torque-transmitting mechanisms are selectively engageable in combinations of two to yield eight forward speed ratios and at least one reverse speed ratio.

The resulting transmission provides a significantly wider ratio spread in comparison to transmissions with fewer speed ratios. Additionally, close ratio steps are achieved.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 1A is a schematic representation of a powertrain including one embodiment of a planetary transmission of the present invention;

FIG. 1B is a truth table and chart depicting some of the operating characteristics of the powertrain shown in FIG. 1A;

FIG. 2A is a schematic representation of a powertrain having a second embodiment of a planetary transmission of the present invention;

FIG. 2B is a truth table and chart depicting some of the operating characteristics of the powertrain shown in FIG. 2A;

DESCRIPTION OF THE PREFERRED EMBODIMENTS

Figures 3A, 3B:
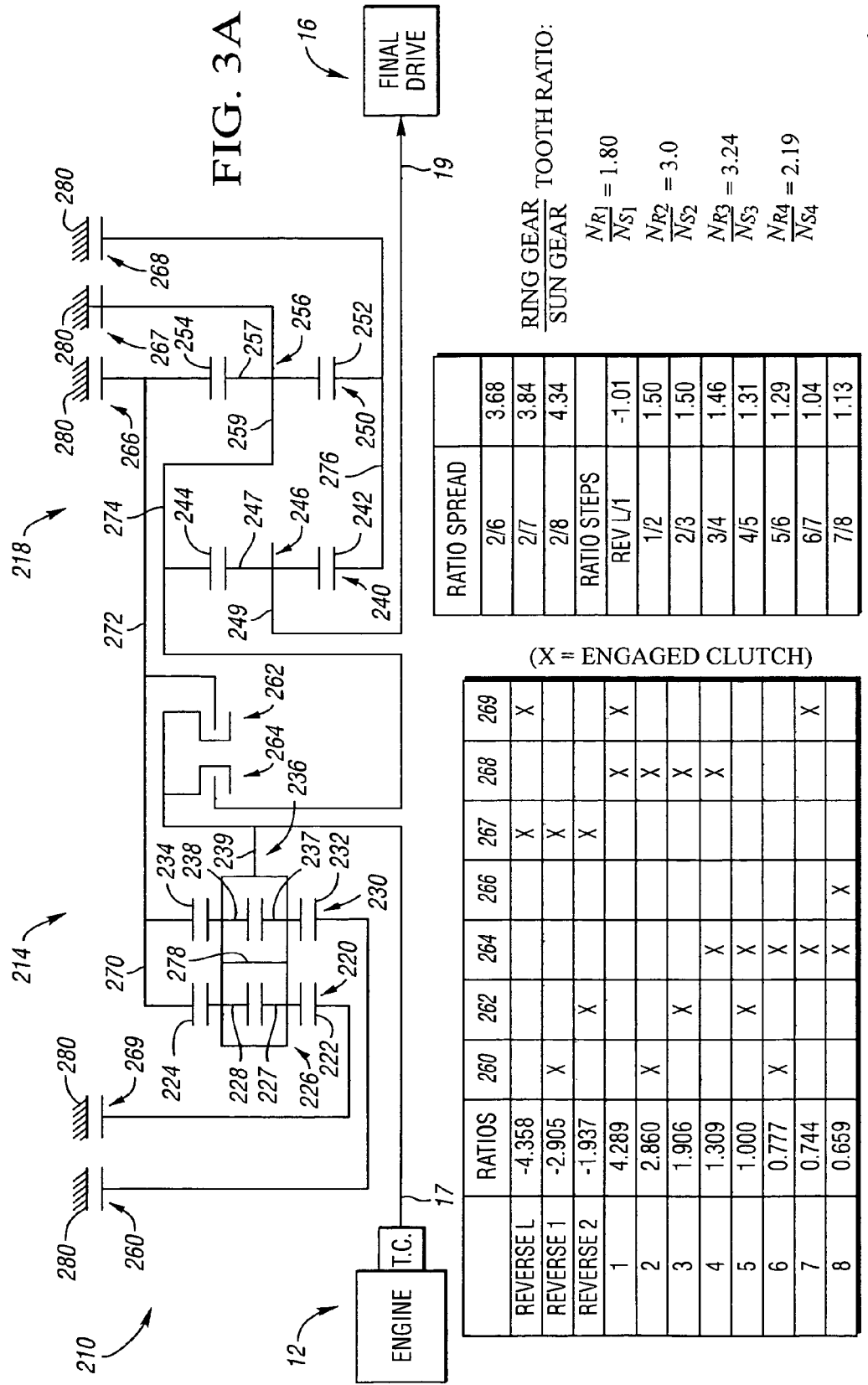
FIG. 3A is a schematic representation of a powertrain incorporating a third embodiment of a planetary transmission of the present invention.
FIG. 3B is a truth table and chart depicting some of the operating characteristics of the powertrain shown in FIG. 3A.

Referring to the drawings, wherein like reference numerals represent the same or corresponding parts through the several views, there is shown in FIG. 1A a powertrain 10 having a conventional engine and torque converter 12, a planetary transmission 14 and a conventional final drive mechanism 16.

The planetary transmission 14 includes an input shaft 17 continuously connected with the engine and torque converter 12, a planetary gear arrangement 18, and an output shaft 19 continuously connected with the final drive mechanism 16. The planetary gear arrangement 18 includes four planetary gear sets 20, 30, 40 and 50.

The planetary gear set 20 includes a sun gear member 22, a ring gear member 24, and a planet carrier assembly member 26. The planet carrier assembly member 26 includes a plurality of pinion gears 27 rotatably mounted on a carrier member 29 and disposed in meshing relationship with both the sun gear member 22 and the ring gear member 24.

The planetary gear set 30 includes a sun gear member 32, a ring gear member 34, and a planet carrier assembly member 36. The planet carrier assembly member 36 includes a plurality of pinion gears 37 rotatably mounted on the carrier member 39 and disposed in meshing relationship with both the sun gear member 32 and the ring gear member 34.

The planetary gear set 40 includes a sun gear member 42, a ring gear member 44, and a planet carrier assembly member 46. The planet carrier assembly member 46 includes a plurality of pinion gears 47 rotatably mounted on the carrier member 49 and disposed in meshing relationship with both the sun gear member 42 and the ring gear member 44.

The planetary gear set 50 includes a sun gear member 52, a ring gear member 54, and a planet carrier assembly member 56. The planet carrier assembly member 56 includes a plurality of pinion gears 57 rotatably mounted on the carrier member 59 and disposed in meshing relationship with both the sun gear member 52 and the ring gear member 54.

The input shaft 17 is continuously connected with the sun gear member 22 via a drum 92 to which a first intermediate shaft 94 is continuously interconnected. Notably, the input shaft 17 is also continuously connected with the sun gear member 32 via an interconnecting member 78 which interconnects the sun gear members 22 and 32. The output shaft 19 is continuously connected with the planet carrier assembly member 46. The planet carrier assembly member 26 is continuously connected with the ring gear member 34 though the interconnecting member 70. The planet carrier assembly member 36 is continuously connected with the ring gear member 54 through the interconnecting member 72. The sun gear member 42 is continuously connected with the sun gear member 52 through the interconnecting member 74. The ring gear member 44 is continuously connected with the planet carrier assembly member 56 through the interconnecting member 76. The sun gear member 32 is continuously connected with the sun gear member 22 through the interconnecting member 78 and, therefore, to the input shaft 17 (indirectly via the first intermediate shaft 94 and the drum 92).

The ring gear member 24 is selectively connectable with the transmission housing 80 through the clutch 60. The ring gear member 24 is selectively connectable with the input shaft 17 through the clutch 62. The ring gear member 44 is selectively connectable with the input shaft 17 through the clutch 64. The ring gear member 54 is selectively connectable with the transmission housing 80 through the brake 66. The planet carrier assembly member 56 is selectively connectable with the transmission housing 80 through the brake 67. The sun gear member 52 is selectively connectable with the transmission housing 80 through the brake 68. The ring gear member 34 is selectively connectable with the transmission housing 80 through the brake 69.

As shown in FIG. 1B, and in particular the truth table disclosed therein, the torque-transmitting mechanisms are selectively engaged in combinations of two to provide eight forward speed ratios and three reverse speed ratios. The torque-transmitting mechanisms 60, 62, 64, 66, 67, 68 and 69 are preferably of the multiple disk-type, fluid-actuated friction-drive establishing device which are commonly used in planetary gear transmissions.

The Reverse L speed ratio is established with the engagement of the brakes 67 and 69. The brake 67 connects the planet carrier assembly member 56 with the transmission housing 80, and the brake 69 connects the ring gear member 34 with the transmission housing 80. The sun gear member 22 and the sun gear member 32 rotate at the same speed as the input shaft 17. The planet carrier assembly member 36 rotates at the same speed as the ring gear member 54. The ring gear member 34 and the planet carrier assembly member 26 do not rotate. The planet carrier assembly member 36 rotates at a speed determined from the speed of the sun gear member 32 and the ring gear/sun gear tooth ratio of the planetary gear set 30. The planet carrier assembly member 56 and the ring gear member 44 do not rotate. The sun gear member 52 rotates at the same speed as the sun gear member 42. The sun gear member 52 rotates at a speed determined from the speed of the ring gear member 54 and the ring gear/sun gear tooth ratio of the planetary gear set 50. The planet carrier assembly member 46 rotates at the same speed as the output shaft 19. The planet carrier assembly member 46, and therefore the output shaft 19, rotates at a speed determined from the speed of the sun gear member 42 and the ring gear/sun gear tooth ratio of the planetary gear set 40. The numerical value of the Reverse L speed ratio is determined utilizing the ring gear/sun gear tooth ratios of the planetary gear sets 30, 40 and 50.

The Reverse 1 speed ratio is established with the engagement of the brakes 60 and 67. The brake 60 connects the ring gear member 24 with the transmission housing 80, and the brake 67 connects the planet carrier assembly member 56 with the transmission housing 80. The sun gear member 22 and the sun gear member 32 rotate at the same speed as the input shaft 17. The planet carrier assembly member 26 rotates at the same speed as the ring gear member 34. The ring gear member 24 does not rotate. The planet carrier assembly member 26 rotates at a speed determined from the speed of the sun gear member 22 and the ring gear/sun gear tooth ratio of the planetary gear set 20. The planet carrier assembly member 36 rotates at the same speed as the ring gear member 54. The planet carrier assembly member 36 rotates at a speed determined from the speed of the sun gear member 32, the speed of the ring gear member 34, and the ring gear/sun gear tooth ratio of the planetary gear set 30. The sun gear member 52 rotates at the same speed as the sun gear member 42. The planet carrier assembly member 56 and the ring gear member 44 do not rotate. The sun gear member 52 rotates at a speed determined from the speed of the ring gear member 54 and the ring gear/sun gear tooth ratio of the planetary gear set 50. The planet carrier assembly member 46 rotates at the same speed as the output shaft 19. The planet carrier assembly member 46, and therefore the output shaft 19, rotates at a speed determined from the speed of the sun gear member 42 and the ring gear/sun gear tooth ratio of the planetary gear set 40. The numerical value of the Reverse 1 speed ratio is determined utilizing the ring gear/sun gear tooth ratios of the planetary gear sets 20, 30, 40 and 50.

The Reverse 2 speed ratio is established with the engagement of the clutch 62 and the brake 67. The clutch 62 connects the ring gear member 24 with the input shaft 17. The brake 67 connects the planet carrier assembly member 56 with the transmission housing 80. The planetary gear sets 20 and 30 and the ring gear member 54 rotate at the same speed as the input shaft 17. The planet carrier assembly member 56 and the ring gear member 44 do not rotate. The sun gear member 52 rotates at the same speed as the sun gear member 42. The sun gear member 52 rotates at a speed determined from the speed of the ring gear member 54 and the ring gear/sun gear tooth ratio of the planetary gear set 50. The planet carrier assembly member 46 rotates at the same speed as the output shaft 19. The planet carrier assembly member 46, and therefore the output shaft 19, rotates at a speed determined from the speed of the sun gear member 42 and the ring gear/sun gear tooth ratio of the planetary gear set 40. The numerical value of the Reverse 2 speed ratio is determined utilizing the ring gear/sun gear tooth ratios of the planetary gear sets 30 and 40.

The first forward speed ratio, which may also be referred to as low speed, is established with the engagement of the brakes 68 and 69. The brake 68 connects the sun gear member 52 with the transmission housing 80, and the brake 69 connects the ring gear member 34 with the transmission housing 80. The sun gear member 22 and the sun gear member 32 rotate at the same speed as the input shaft 17. The planet carrier assembly member 36 rotates at the same speed as the ring gear member 54. The ring gear member 34 and the planet carrier assembly member 26 do not rotate. The planet carrier assembly member 36 rotates at a speed determined from the speed of the sun gear member 32 and the ring gear/sun gear tooth ratio of the planetary gear set 30. The sun gear members 42 and 52 do not rotate. The planet carrier assembly member 56 rotates at the same speed as the ring gear member 44. The planet carrier assembly member 56 rotates at a speed determined from the speed of the ring gear member 54 and the ring gear/sun gear tooth ratio of the planetary gear set 50. The planet carrier assembly member 46 rotates at the same speed as the output shaft 19. The planet carrier assembly member 46, and therefore the output shaft 19, rotates at a speed determined from the speed of the ring gear member 44 and the ring gear/sun gear tooth ratio of the planetary gear set 40. The numerical value of the first forward speed ratio is determined utilizing the ring gear/sun gear tooth ratios of the planetary gear sets 30, 40 and 50.

The second forward speed ratio is established with the engagement of the brakes 60 and 68. The brake 60 connects the ring gear member 24 with the transmission housing 80 and the brake 68 connects the sun gear member 52 with the transmission housing 80. The sun gear member 22 and the sun gear member 32 rotate at the same speed as the input shaft 17. The planet carrier assembly member 26 rotates at the same speed as the ring gear member 34. The ring gear member 24 does not rotate. The planet carrier assembly member 26 rotates at a speed determined from the speed of the sun gear member 22 and the ring gear/sun gear tooth ratio of the planetary gear set 20. The planet carrier assembly member 36 rotates at the same speed as the ring gear member 54. The planet carrier assembly member 56 rotates at a speed determined from the speed of the ring gear member 34, the speed of the sun gear member 32, and the ring gear/sun gear tooth ratio of the planetary gear set 30. The planet carrier assembly member 56 rotates at the same speed as the ring gear member 44. The sun gear member 52 and the sun gear member 42 do not rotate. The planet carrier assembly member 56 rotates at a speed determined from the speed of the ring gear member 54 and the ring gear/sun gear tooth ratio of the planetary gear set 50. The planet carrier assembly member 46 rotates at the same speed as the output shaft 19. The planet carrier assembly member 46, and therefore the output shaft 19, rotates at a speed determined from the speed of the ring gear member 44 and the ring gear/sun gear tooth ratio of the planetary gear set 40. The numerical value of the second forward speed ratio is determined utilizing the ring gear/sun gear tooth ratios of the planetary gear sets 20, 30, 40 and 50.

The third forward speed ratio is established with the engagement of the clutch 62 and the brake 68. The clutch 62 connects the ring gear member 24 with the input shaft 17, and the brake 68 connects the sun gear member 52 with the transmission housing 80. The planetary gear sets 20 and 30 and the ring gear member 54 rotate at the same speed as the input shaft 17. The sun gear members 42 and 52 do not rotate. The planet carrier assembly member 56 rotates at the same speed as the ring gear member 44. The planet carrier assembly member 56 rotates at a speed determined from the speed of the ring gear member 54 and the ring gear/sun gear tooth ratio of the planetary gear set 50. The planet carrier assembly member 46 rotates at the same speed as the output shaft 19. The planet carrier assembly member 46, and therefore the output shaft 19, rotates at a speed determined from the speed of the ring gear member 44 and the ring gear/sun gear tooth ratio of the planetary gear set 40. The numerical value of the third forward speed ratio is determined utilizing the ring gear/sun gear tooth ratios of the planetary gear sets 40 and 50.

The fourth forward speed ratio is established with the engagement of the clutch 64 and the brake 68. The clutch 64 connects the ring gear member 44 with the input shaft 17, and the brake 68 connects the sun gear member 52 with the transmission housing 80. The sun gear members 22 and 32, the ring gear member 44 and the planet carrier assembly member 56 rotate at the same speed as the input shaft 17. The sun gear members 42 and 52 do not rotate. The planet carrier assembly member 46 rotates at the same speed as the output shaft 19. The planet carrier assembly member 46, and therefore the output shaft 19, rotates at a speed determined from the speed of the ring gear member 44 and the ring gear/sun gear tooth ratio of the planetary gear set 40. The numerical value of the fourth forward speed ratio is determined utilizing the ring gear/sun gear tooth ratios of the planetary gear set 40.

The fifth forward speed ratio is established with the engagement of the clutches 62 and 64. The clutch 62 connects the ring gear member 24 with the input shaft 17, and the clutch 64 connects the ring gear member 44 with the input shaft 17. In this configuration, the input shaft 17 is connected with the output shaft 19 such that the numerical value of the fifth forward speed ratio is 1.

The sixth forward speed ratio is established with the engagement of the brake 60 and the clutch 64. The brake 60 connects the ring gear member 24 with the transmission housing 80, and the clutch 64 connects the ring gear member 44 with the input shaft 17. The sun gear members 22 and 32, the ring gear member 44 and the planet carrier assembly member 56 rotate at the same speed as the input shaft 17. The planet carrier assembly member 26 rotates at the same speed as the ring gear member 34. The ring gear member 24 does not rotate. The planet carrier assembly member 26 rotates at a speed determined from the speed of the sun gear member 22 and the ring gear/sun gear tooth ratio of the planetary gear set 20. The planet carrier assembly member 36 rotates at the same speed as the ring gear member 54. The planet carrier assembly member 36 rotates at a speed determined from the speed of the ring gear member 34, the speed of the sun gear member 32, and the ring gear/sun gear tooth ratio of the planetary gear set 30. The sun gear member 52 rotates at the same speed as the sun gear member 42. The sun gear member 52 rotates at a speed determined from the speed of the planet carrier assembly member 56, the speed of the ring gear member 54 and the ring gear/sun gear tooth ratio of the planetary gear set 50. The planet carrier assembly member 46 rotates at the same speed as the output shaft 19. The planet carrier assembly member 46, and therefore the output shaft 19, rotates at a speed determined from the speed of the ring gear member 44, the speed of the sun gear member 42, and the ring gear/sun gear tooth ratio of the planetary gear set 40. The numerical value of the sixth forward speed ratio is determined utilizing the ring gear/sun gear tooth ratios of the planetary gear sets 20, 30, 40 and 50.

The seventh forward speed ratio is established with the engagement of the clutch 64 and the brake 69. The clutch 64 connects the ring gear member 44 with the input shaft 17, and the brake 69 connects the ring gear member 34 with the transmission housing 80. The sun gear members 22 and 32, the ring gear member 44 and the planet carrier assembly member 56 rotate at the same speed as the input shaft 17. The planet carrier assembly member 36 rotates at the same speed as the ring gear member 54. The ring gear member 34 and the planet carrier assembly member 26 do not rotate. The planet carrier assembly member 36 rotates at a speed determined from the speed of the sun gear member 32 and the ring gear/sun gear tooth ratio of the planetary gear set 30. The sun gear member 52 rotates at the same speed as the sun gear member 42. The sun gear member 52 rotates at a speed determined from the speed of the planet carrier assembly member 56, the speed of the ring gear member 54 and the ring gear/sun gear tooth ratio of the planetary gear set 50. The planet carrier assembly member 46 rotates at the same speed as the output shaft 19. The planetary carrier assembly member 46, and therefore the output shaft 19, rotates at a speed determined from the speed of the ring gear member 44, the speed of the sun gear member 42 and the ring gear/sun gear tooth ratio of the planetary gear set 40. The numerical value of the seventh forward speed ratio is determined utilizing the ring gear/sun gear tooth ratios of the planetary gear sets 30, 40 and 50.

The eighth forward speed ratio is established with the engagement of the clutch 64 and the brake 66. The clutch 64 connects the ring gear member 44 with the input shaft 17, and the brake 66 connects the ring gear member 54 with the transmission housing 80. The sun gear members 22 and 32, the ring gear member 44 and the planet carrier assembly member 56 rotate at the same speed as the input shaft 17. The planet carrier assembly member 36 and the ring gear member 54 do not rotate. The ring gear member 34 rotates at the same speed as the planet carrier assembly member 26. The ring gear member 34 rotates at a speed determined from the speed of the sun gear member 32 and the ring gear/sun gear tooth ratio of the planetary gear set 30. The sun gear member 52 rotates at the same speed as the sun gear member 42. The sun gear member 52 rotates at a speed determined from the speed of the planet carrier assembly member 56 and the ring gear/sun gear tooth ratio of the planetary gear set 50. The planet carrier assembly member 46 rotates at the same speed as the output shaft 19. The planet carrier assembly member 46, and therefore the output shaft 19, rotates at a speed determined from the speed of the ring gear member 44, the speed of the sun gear member 42 and the ring gear/sun gear tooth ratio of the planetary gear set 40. The numerical value of the eighth forward speed ratio is determined utilizing the ring gear/sun gear tooth ratios of the planetary gear sets 30, 40 and 50.

As set forth above, the engagement schedule for the torque-transmitting mechanisms is shown in the truth table of FIG. 1B. This truth table also provides an example of speed ratios that are available utilizing the ring gear/sun gear tooth ratios given by way of example in FIG. 1B. The $N_{R1}/S_{R1}$ value is the tooth ratio of the planetary gear set 20; the $N_{R2}/S_{R2}$ value is the tooth ratio of the planetary gear set 30; the $N_{R3}/S_{R3}$ value is the tooth ratio of the planetary gear set 40 and the $N_{R4}/S_{R4}$ value is the tooth ratio of the planetary gear set 50.

Also, the chart of FIG. 1B describes the ratio steps that are attained utilizing the sample of tooth ratios given. For example, the step ratio between the first and second forward speed ratios is 1.69, while the step ratio between the Reverse L ratio and the first forward speed ratio is −1.01. It should be noted that the single and double step forward ratio interchanges are of the single transition variety.

The transmission 14 of FIG. 1A provides a simplified layout by interconnecting the sun gear members 42 and 52 and the ring gear member 44 with the planet carrier assembly member 56 of the planetary gear sets 40 and 50. Shafting requirements for the transmission 14 are minimized by interconnecting the sun gear member 22 and 32 with the drum 92 and therefore the input shaft 17 via the first intermediate shaft 94, while selectively interconnecting the ring gear member 44 and the planet carrier assembly member 56 with the drum 92 and therefore the input shaft 17 via the second intermediate shaft 96 when the clutch 64 is engaged, and by creating the first and second intermediate shafts 94, 96 such that they are coaxially disposed. This allows for a compact arrangement. As is apparent from the speed ratios shown in the truth table of FIG. 1B, the transmission 14 provides a deep ratio, progressive step solution. The speed ratios for Reverse L and the first forward speed ratio are nearly identical (although reversed in direction from one another). The first forward speed is a very deep ratio at 5.766. This is useful for towing applications. Additionally, substantially equivalent ratio steps are provided throughout along with a wide ratio spread of 8.7427.

FIG. 2A shows a powertrain 110 having a conventional engine and torque converter 12, a planetary transmission 114, and a conventional final drive mechanism 16.

The planetary transmission 114 includes an input shaft 17 continuously connected with the engine and torque converter 12, a planetary gear arrangement 118, and an output shaft 19 continuously connected with the final drive mechanism 16. The planetary gear arrangement 118 includes four planetary gear sets 120, 130, 140 and 150.

The planetary gear set 120 includes a sun gear member 122, a ring gear member 124, and a planet carrier assembly member 126. The planet carrier assembly member 126 is of the compound type including pinion gears 127 and 128 mounted on a carrier member 129. Pinion gear 127 is disposed in meshing relationship with the sun gear member 122 and pinion gear 128. Pinion gear 128 is disposed in meshing relationship with the pinion gear 127 and the ring gear member 124.

The planetary gear set 130 includes a sun gear member 132, a ring gear member 134 and a planet carrier assembly member 136. The planet carrier assembly member 136 includes a plurality of pinion gears 137 rotatably mounted on the carrier member 139 disposed in meshing relationship with both the sun gear member 132 and the ring gear member 134.

The planetary gear set 140 includes a sun gear member 142, a ring gear member 144, and a planet carrier assembly member 146. The planet carrier assembly member 146 includes a plurality of pinion gears 147 rotatably mounted on the carrier member 149 and disposed in meshing relationship with both the sun gear member 142 and the ring gear member 144.

The planetary gear set 150 includes a sun gear member 152, a ring gear member 154, and a planet carrier assembly member 156. The planet carrier assembly member 156 includes a plurality of pinion gears 157 rotatably mounted on the carrier member 159 and disposed in meshing relationship with both the sun gear member 152 and the ring gear member 154.

The planetary gear arrangement 118 also includes seven torque-transmitting mechanisms 160, 162, 164, 166, 167, 168 and 169. The torque-transmitting mechanisms 162 and 164 are rotating-type torque-transmitting mechanisms, commonly termed clutches. The torque-transmitting mechanisms 160, 166, 167, 168 and 169 are stationary-type torque-transmitting mechanisms, commonly termed brakes or reaction clutches.

The input shaft 17 is continuously connected with the planet carrier assembly member 126, and the output shaft 19 is continuously connected with the planet carrier assembly member 146. The ring gear member 124 is continuously connected with the planet carrier assembly member 136 through the interconnecting member 170. The sun gear member 142 is continuously connected with the sun gear member 152 through the interconnecting member 172. The ring gear member 144 is continuously connected with the planet carrier assembly member 156 through the interconnecting member 174. The planet carrier assembly member 136 is continuously connected with the ring gear member 154 through the interconnecting member 176. The interconnecting member 176 may be one component or separate components. The sun gear member 132 is continuously connected with the planet carrier assembly member 126 (and therefore with the input shaft 17) through the interconnecting member 178.

The sun gear member 122 is selectively connectable with the transmission housing 180 through the brake 160. The ring gear member 154 is selectively connectable with the input shaft 17 through the clutch 162. The ring gear member 144 is selectively connectable with the input shaft 17 through the clutch 164. The ring gear member 154 selectively connectable with the transmission housing 180 through the brake 166. The planet carrier assembly member 156 is selectively connectable with the transmission housing 180 through the brake 167. The sun gear member 152 is selectively connectable with the transmission housing 180 through the brake 168. The ring gear member 134 is selectively connectable with the transmission housing 180 through the brake 169.

The truth table of FIG. 2B describes the engagement sequence utilized to provide eight forward speed ratios and three reverse speed ratios in the planetary gear arrangement 118 shown in FIG. 2A. As shown and described above for the configuration of FIG. 1A, those skilled in the art will understand from the truth table of FIG. 2B how the speed ratios shown are established through the planetary gear sets 120, 130, 140 and 150.

The truth table of FIG. 2B also provides an example of the ratios that can be attained with the planetary gear sets shown in FIG. 2A utilizing the sample tooth ratios given in FIG. 2B. The $N_{R1}/S_{R1}$ value is the tooth ratio of the planetary gear set 120; the $N_{R2}/S_{R2}$ value is the tooth ratio of the planetary gear set 130; the $N_{R3}/S_{R3}$ value is the tooth ratio of the planetary gear set 140; and the $N_{R4}/S_{R4}$ value is the tooth ratio of the planetary gear set 150.

Also shown in FIG. 2B are the ratio steps between the single step ratios in the forward direction as well as the Reverse L to first forward speed ratio step. For example, the first to second step ratio is 1.78. It should also be noted that the single step and double step forward ratio interchanges are of the single transition variety.

Notably, the arrangement of the planetary transmission 114 reduces the speed of the planet carrier assembly member 126. By utilizing a compound (double pinion) for planet carrier assembly member 126, the planet carrier assembly member 126 is driven at the speed of the input shaft 17. The ring gear 124 is connected with the planet carrier assembly member 136. Because the compound planet carrier assembly member 126 "splits" the input shaft speed 17 between the pinion gear 127 and the pinion gear 128, the transmission 114 provides a reduced speed ratio to carrier 136 and interconnecting drum 174 when clutch 160 is applied, resulting in similar ratios achieved in transmission 14 of FIG. 1A. In fourth forward speed, the clutches 164 and 168 are applied. In this situation, the ring gear 154 is driven faster than input speed. This arrangement reduces the speed of the planet carrier assembly member 126.

If clutch 166 were not provided, the transmission 114 would still provide the first seven forward speed ratios with six torque transmitting mechanisms 160, 162, 164, 167, 168 and 169, because clutch 166 is not utilized to establish any of the first seven forward speed ratios.

Turning to FIG. 3A, a powertrain 210 includes the engine and torque converter 12, a planetary transmission 214 and a final drive mechanism 16. The planetary transmission 214 includes an input shaft 17 continuously connected with the engine and torque converter 12, a planetary gear arrangement 218, and an output shaft 19 continuously connected with the final drive mechanism 16. The planetary gear arrangement 218 includes four planetary gear sets 220, 230, 240, and 250.

The planetary gear set 220 includes a sun gear member 222, a ring gear member 224 and a planet carrier assembly member 226. The planet carrier assembly member 226 is of the compound planetary type and includes pinion gears 227 and 228 rotatably mounted on a carrier member 239. The pinion gear 227 is disposed in meshing relationship with the sun gear member 222 and the pinion gear 228. The pinion gear 228 is disposed in meshing relationship with the pinion gear 227 and the ring gear 224.

The planetary gear set 230 includes a sun gear member 232, a ring gear member 234 and a compound-type planet carrier assembly member 236. The planet carrier assembly member 236 includes pinion gears 237 and 238 rotatably mounted on a carrier member 239. Pinion gear 237 is disposed in meshing relationship with the sun gear member 232 and pinion gear 238. Pinion gear 238 is disposed in meshing relationship with pinion gear 237 and the ring gear member 234. The planet carrier assembly members 226 and 236 share a common wall 278 such that they are continuously interconnected for common rotation.

The planetary gear set 240 includes a sun gear member 242, a ring gear member 244 and a planet carrier assembly member 246. The planet carrier assembly member 246 includes a plurality of pinion gears 247 rotatably mounted on a carrier member 249 and disposed in meshing relationship with both the sun gear member 242 and the ring gear member 244.

The planetary gear set 250 includes a sun gear member 252, a ring gear member 254, and a planet carrier assembly member 256. The planet carrier assembly member 256 includes a plurality of pinion gears 257 rotatably mounted on a carrier member 259 and disposed in meshing relationship with both the sun gear member 252 and the ring gear member 254.

The planetary gear arrangement 218 also includes seven torque-transmitting mechanisms 260, 262, 264, 266, 267, 268, and 269. The torque-transmitting mechanisms 262 and 264 are rotating-type torque-transmitting mechanisms, commonly termed clutches. The torque-transmitting mechanisms 260, 266, 267, 268, and 269 are stationary-type torque-transmitting mechanisms, commonly termed brakes or reaction clutches.

The input shaft 17 is continuously connected with the planet carrier assembly member 236 (and also with planet carrier assembly member 226 due to the common wall 278). The output shaft 19 is continuously connected with the planet carrier assembly member 246. The ring gear member 224 is continuously connected with the ring gear member 234 through the interconnecting member 270. The ring gear member 234 is continuously connected with the ring gear member 254 through the interconnecting member 272. The interconnecting members 270 and 272 may be made integral. The ring gear member 244 is continuously connected with the planet carrier assembly member 256 through the interconnecting member 274. The sun gear member 242 is continuously connected with the sun gear member 252 through the interconnecting member 276. The planet carrier assembly member 226 is continuously connected with the planet carrier assembly member 236 through the shared housing common wall 278.

The sun gear member 232 is selectively connectable with the transmission housing 280 through the brake 260. The ring gear member 254 is selectively connectable with the input shaft 17 through the clutch 262. The ring gear member 244 is selectively connectable with the input shaft 17 through the clutch 264. The ring gear member 254 (and therefore the ring gear members 224 and 234 due to the interconnecting members 270 and 272) is selectively connectable with the transmission housing 280 through the brake 266. The planet carrier assembly member 256 (and therefore the ring gear member 244 due to the interconnecting member 274) is selectively connectable with the transmission housing 280 through the brake 267. The sun gear member 252 (and therefore the sun gear member 242 due to the interconnecting member 276) is selectively connectable with the transmission housing 280 through the brake 268.

The sun gear member 222 is selectively connectable with the transmission housing 280 through the brake 269.

The truth table of FIG. 3B describes the engagement sequence utilized to provide eight forward speed ratios and three reverse speed ratios in the planetary gear arrangement 218 shown in FIG. 3A. As shown and described above for the configuration of FIG. 1A, those skilled in the art will understand from the truth table of FIG. 3B how the speed ratios are established through the planetary gear sets 220, 230, 240 and 250. The truth table of FIG. 3B also provides an example of the ratios that can be attained with the planetary gear arrangement 218 shown in FIG. 2A utilizing the sample tooth ratios given in FIG. 2B. The $N_{R1}/S_{R1}$ value is of tooth ratio of the planetary gear set 220; the $N_{R2}/S_{R2}$ value is the tooth ratio of the planetary gear set 230; the $N_{R3}/S_{R3}$ value is the tooth ratio of the planetary gear set 240; and the $N_{R4}/S_{R4}$ value is the tooth ratio of the planetary gear set 250. Also shown in FIG. 3B are the ratio steps between the single step ratios in the forward direction as well as the Reverse L to first forward speed ratio step. For example, the first to second step ratio is 1.50. It should also be noted that the single and double step forward ratio interchanges are of the single transition variety. Utilizing the ring gear to sun gear tooth ratios disclosed in FIG. 3B, it is apparent to those skilled in the art that the ratio of the planet carrier assembly members 226 and 236 are reduced to achieve a close ratio transmission. For example, the overall ratio between the first forward speed and the eighth forward speed ratio is 4.34. This ratio may be established between 3.5 to 4.5, as desired for a particular application, by selecting different ring gear/ sun gear tooth ratios. The first forward speed ratio (low gear) is a deep ratio of 4.289. Additionally, numerically close ratio steps are achieved.

While the best modes for carrying out the invention have been described in detail, those familiar with the art to which this invention relates will recognize various alternative designs and embodiments for practicing the invention within the scope of the appended claims.

The invention claimed is:

1. A multi-speed transmission comprising:
   an input shaft;
   an output shaft;
   first, second, third and fourth planetary gear sets each having a first, a second and a third member, said members including a sun gear member, a ring gear member and a planet carrier assembly member;
   said input shaft being continuously connected with a member of said planetary gear sets and said output shaft being continuously connected with another member of said planetary gear sets;
   a first interconnecting member continuously interconnecting said first member of said first planetary gear set with said first member of said second planetary gear set;
   a second interconnecting member continuously interconnecting said second member of said first planetary gear set with said second member of said second planetary gear set;
   a third interconnecting member continuously interconnecting said first member of said third planetary gear set with said first member of said fourth planetary gear set;
   a fourth interconnecting member continuously interconnecting said second member of said third planetary gear set with said second member of said fourth planetary gear set;
   a fifth interconnecting member continuously interconnecting one of said second and said third members of said second planetary gear set with said third member of said fourth planetary gear set; and
   seven torque-transmitting mechanisms, operable for selectively interconnecting said members of said planetary gear sets with said input shaft, with a stationary member or with other members of said planetary gear sets, said seven torque-transmitting mechanisms being engaged in combinations of two to establish at least eight forward speed ratios and at least one reverse speed ratio between said input shaft and said output shaft.

2. The multi-speed transmission of claim 1, wherein said member of said planetary gear sets that is continuously interconnected with said input shaft is said first member of said first planetary gear set.

3. The multi-speed transmission of claim 1, wherein said another member of said planetary gear sets that is continuously connected with said output shaft is said third member of said third planetary gear set.

4. The multi-speed transmissions of claim 1, wherein said planet carrier assembly member of said first planetary gear set is a double-pinion carrier.

5. The multi-speed transmission of claim 4, wherein said planet carrier assembly member of said second planetary gear set is a double-pinion carrier, said planet carrier assembly member of said first planetary gear set and said planet carrier assembly member of said second planetary gear set being said first member of said first planetary gear set and said first member of said second planetary gear set, respectively; and
   wherein said first interconnecting member is a common wall of said first member of said first planetary gear set and of said first member of said second planetary gear set.

6. The multi-speed transmission of claim 1, wherein a first of said seven torque-transmitting mechanisms is operable for selectively interconnecting said third member of said first planetary gear set with said stationary member.

7. The multi-speed transmission of claim 1, wherein a second of said seven torque-transmitting mechanisms is operable for selectively interconnecting one of said third member of said fourth planetary gear set and said third member of said first planetary gear set with said input shaft.

8. The multi-speed transmission of claim 1, wherein a third of said seven torque-transmitting mechanisms is operable for selectively interconnecting said second member of said third planetary gear set with said input shaft.

9. The multi-speed transmission of claim 1, wherein a fourth of said seven torque-transmitting mechanisms is operable for selectively interconnecting said third member of said fourth planetary gear set with said stationary member.

10. The multi-speed transmission of claim 1, wherein a fifth of said seven torque-transmitting mechanisms is operable for selectively interconnecting said second member of said fourth planetary gear set with said stationary member.

11. The multi-speed transmission of claim 1, wherein a sixth of said seven torque-transmitting mechanisms is operable for selectively interconnecting said first member of said fourth planetary gear set with said stationary member.

12. The multi-speed transmission of claim 1, wherein a seventh of said seven torque-transmitting mechanisms is operable for selectively interconnecting one of said second and said third members of said second planetary gear set with said stationary member.

13. The multi-speed transmission of claim 1, wherein forward ratio shifts are of the single transition type.

14. The multi-speed transmission of claim 1, wherein said first and fifth interconnecting members are integral.

15. A multi-speed transmission comprising:
an input shaft;
an output shaft;
first, second, third and fourth planetary gear sets each having a first, a second and a third member, said members including a sun gear member, a ring gear member and a planet carrier assembly member;
said first member of said first planetary gear set being continuously connected with said first member of said second planetary gear set and said input shaft;
said second member of said first planetary gear set being continuously interconnected with said second member of said second planetary gear set;
said first member of said third planetary gear set being continuously interconnected with said first member of said fourth planetary gear set;
said second member of said third planetary gear set being continuously interconnected with said second member of said fourth planetary gear set;
one of said second and said third members of said second planetary gear set being continuously interconnected with said third member of said fourth planetary gear set;
said third member of said third planetary gear set being continuously interconnected with said output shaft;
a first torque-transmitting mechanism operable for selectively interconnecting said third member of said first planetary gear set with a stationary member;
a second torque-transmitting mechanism operable for selectively interconnecting one of said third member of said fourth planetary gear set and said third member of said first planetary gear set with said input shaft;
a third torque-transmitting mechanism operable for selectively interconnecting said second member of said third planetary gear set with said input shaft;
a fourth torque-transmitting mechanism operable for selectively interconnecting said third member of said fourth planetary gear set with said stationary member;
a fifth torque-transmitting mechanism operable for selectively interconnecting said second member of said fourth planetary gear set with said stationary member;
a sixth torque-transmitting mechanism operable for selectively interconnecting said first member of said fourth planetary gear set with said stationary member;
a seventh torque-transmitting mechanism operable for selectively interconnecting one of said second and third members of said second planetary gear set with said stationary member; and
said seven torque-transmitting mechanisms being operable in combination of two to provide eight forward speed ratios and at least one reverse speed ratio.

16. The multi-speed transmission of claim 15, wherein said first member of said first planetary gear set is a planet carrier assembly member of the double-pinion type.

17. The multi-speed transmission of claim 16, wherein said first member of said second planetary gear set is a planet carrier assembly member of the double-pinion type, said planet carrier assembly member of said first planetary gear set and said planet carrier assembly member of said second planetary gear set sharing a common wall to continuously interconnect with one another.

18. The multi-speed transmissions of claim 15, wherein said input shaft is continuously interconnected with said first member of said first planetary gear set via a first intermediate shaft;
wherein said first member of said first planetary gear set is continuously interconnected with said first member of said second planetary gear set via said first intermediate shaft;
wherein said first member of said first planetary gear set and said first member of said second planetary gear set are sun gears;
wherein a second intermediate shaft is continuously connected with said second member of said third planetary gear set, said third torque-transmitting mechanism selectively interconnecting said input shaft with said second member of said third planetary gear set via said second intermediate shaft; and
wherein said first and second intermediate shafts are coaxially disposed.

19. A multi-speed transmission comprising:
an input shaft;
an output shaft;
first, second, third and fourth planetary gear sets, each of said planetary gear sets having a first, a second and a third member, said members including a sun gear member, a planet carrier assembly member and a ring gear member;
seven torque-transmitting mechanisms, each of said torque-transmitting mechanisms being operable for selectively interconnecting one of said members of said planetary gear sets with said input shaft, with a stationary member or with another of said members of said planetary gear sets;
said input shaft being continuously connected with two of said planetary gear sets and being selectively connectable with the other two of said planetary gear sets via one of said seven torque-transmitting mechanisms
said output shaft being continuously interconnected with one of said members of said planetary gear sets; and
said seven torque-transmitting mechanisms being engaged in combinations of two to establish at least eight forward speed ratios and at least one reverse speed ratio between said input shaft and said output shaft.

* * * * *